(12) United States Patent
Hayashi

(10) Patent No.: US 6,424,491 B1
(45) Date of Patent: Jul. 23, 2002

(54) MAGNETIC TAPE CARTRIDGE HAVING A LOWER REEL RECESS WHICH IS LABYRINTH-ENGAGED WITH A STOPPER RING BARRIER

(75) Inventor: Yoichi Hayashi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/032,460

(22) Filed: Jan. 2, 2002

Related U.S. Application Data

(62) Division of application No. 09/134,040, filed on Aug. 14, 1998.

(30) Foreign Application Priority Data

Aug. 14, 1997 (JP) .............................................. 9-219549
Aug. 14, 1997 (JP) .............................................. 9-219550
Aug. 14, 1997 (JP) .............................................. 9-219551

(51) Int. Cl.[7] ........................................... G11B 23/027
(52) U.S. Cl. ....................................................... 360/132
(58) Field of Search ................................. 360/132, 133; 369/291; 242/326.3, 327, 345

(56) References Cited

U.S. PATENT DOCUMENTS 3,910,692 A * 10/1975 Scibilia .................... 242/347.2
4,203,564 A 5/1980 Nemoto
5,007,596 A 4/1991 Iwahashi
5,074,487 A 12/1991 Okamura et al.

* cited by examiner

Primary Examiner—George J. Letscher
(74) Attorney, Agent, or Firm—Sughrue Mion, PLLC

(57) ABSTRACT

A magnetic tape cartridge has a reel which includes an upper reel and a lower reel which are plastic moldings, the lower reel being welded to the upper reel by ultrasonic welding. In the shoulder of a boss section of the upper reel, a plurality of recesses are formed in such a manner that the recesses are radially outwardly extended from the center of rotation of the upper reel, and on the surface of the lower reel which are confronted with the recesses, a plurality of welding ribs are formed so as to be engaged with the bottoms of the recesses.

1 Claim, 13 Drawing Sheets

MAGNETIC TAPE CARTRIDGE HAVING A LOWER REEL RECESS WHICH IS LABYRINTH-ENGAGED WITH A STOPPER RING BARRIER

This is a division of application Ser. No. 09/134,040 filed Aug. 14, 1998; the entire disclosure of which is incorporated herein by reference.

BACKGROUND OF THE INVENTION

This invention relates to a magnetic tape cartridge formed by ultrasonic welding.

In FIG. 1, reference numeral 1 designates the magnetic tape cartridge. The magnetic tape cartridge 1 is constructed as follows: A magnetic tape 20 is wound on a reel 3 which is formed by combining upper and lower reels 4 and 5 together by ultrasonic welding. The reel 3 is rotatably accommodated in a cartridge casing which is formed by combining upper and lower cartridges 2a and 2b together with screws 19.

The upper reel 4 is made of polycarbonate resin containing glass fibers. The upper reel 4 has an upper flange 4a, and a recess at the center which has a boss section 4b extended towards the center. The upper flange 4a has a gear 4y on its outer cylindrical surface.

The aforementioned recess has a cylindrical rib, in which a ring-shaped bearing 6 is press-fitted. And a spring plug 7 is fixedly press-fitted in the central hole formed in the bearing. A reel spring 8 is mounted on the spring plug 7, to push downwardly the aforementioned reel 3 and hold the reel 3 rotatably.

The lower reel 5 is made of polycarbonate resin, and has a lower flange 5a which has a hole at the center around which an ultrasonic welding rib 5b is formed. The lower reel 5 is combined with the shoulder of the aforementioned boss section 4b.

When the cartridge is not in use, the reel 3 is locked by reel brakes 50 and 51 so that it may not be turned unintentionally, the reel brakes 50, 51 which are suitably urged by braking torsion springs 12. When the magnetic tape cartridge 1 is not in use, the magnetic tape 20 has been completely wound on the reel 3, and the leader tape 21 connected to the end of the magnetic tape is locked to the end of a hook 18 which is provided near the side wall of the cartridge.

The opening, through which the magnetic tape 20 is pulled out is designed as follows: That is, a lid 30, which is swingable in a cartridge plane, is provided while being suitably urged by a torsion spring 15. When the cartridge is not in use, the lid 30 is locked by a locking member 40 (which is suitably urged by a compression spring 16) so that it may not be swung. On the side which is opposite to the side where the lid 13 is provided, the cartridge has a write protect 17.

The aforementioned leader tape 21 is engaged with an engaging means adapted to lead the magnetic tape 20 in the tape path of the recording and reproducing device. The leader tape 21 is fastened to the magnetic tape 20, for instance, by splicing.

In the above-described magnetic tape cartridge 1, the upper and lower reels 4 and 5 are combined together by ultrasonic welding as follows. As was described before, the annular rib 5b, which is formed along the annular edge of the circular opening formed at the center of the lower flange 5a, is engaged with the shoulder of the lower portion of the boss section 4b. Under this condition, while a predetermined pressure is applied to the upper and lower reels 4, 5, those reels 3 are subjected to ultrasonic excitation, so that the rib 5b is molten to combine the upper and lower reels 4 and 5 together.

In this welding operation, the upper reel 4 is set below the lower reel 5. More specifically, the upper reel 4 is fixedly set, and the lower reel 5 is placed on the upper reel 4 from above. Under this condition, the upper reel 4 is subjected to ultrasonic pressure excitation. As the rib 5b is molten, the surface of the lower reel 5 is brought into contact with the shoulder of the upper reel 4. From this fact, it is determined that the welding operation has been accomplished.

FIG. 2 shows the conventional ultrasonic welding portions of the aforementioned reel 3. The boss section 4b of the upper reel 4 comprises a shoulder 4c, and a protrusion 4d which is extended from the shoulder 4c and is smaller in diameter than the shoulder 4c. Along the outer annular edge of the shoulder 4c, a stopper ring 4e is integrally provided which is slightly higher in level. That is, the upper reel 4 is in the form of a shallow-bottomed container as a whole. In addition, between the stopper ring 4e and the protrusion 4d, turn-preventing stoppers 4f are provided in such a manner that they are diametrically opposite to each other, and are flush with each other.

On the other hand, the rib 5b of the lower reel 5 has cuts 5d at angular intervals of 90°. When, with the central hole of the lower reel 5 engaged with the protrusion 4d of the upper reel 4, the lower reel 5 is turned, the cuts 5d are engaged with the turn-preventing stoppers 4f. When, under this condition, the reel 3 is subjected to pressure excitation, the rib 5b is molten. The molten portion of the rib 5b, being absorbed in the shallow-bottomed annular groove, is spread uniformly. As a result, the surface of the lower flange 5a is brought into contact with the upper surface of the stopper ring 4e. Thus, the welding operation has been accomplished.

In the above-described conventional magnetic tape cartridge, the lower flange 5a and the stopper ring 4e are almost in line contact with each other; that is, they are considerably small in contact area. Hence, it is difficult to weld the upper and lower reels 4, 5 together in such a manner that they are high in parallelism. This fact results in a so-called surface play.

In the case where the tape 20 is wound on the reel 3, the tape winding operation is carried out with the upper flange 4a and the boss section 4b of the upper reel 4 as a reference. In this case, since the upper flange 4a and the boss section 4b are formed as one unit by injection molding, the tape 20 can be wound on the reel 3 with high accuracy. However, in the case where the tape winding operation is carried out based on the lower reel 5 and the boss section 4b which suffer from the surface play, it is difficult to achieve the tape winding operation with high accuracy.

If, with the reel 3, the welding area is increased in the direction of the diameter, the width of the stopper ring 4e should be increased. However, in this case, the molten portion flows out of the shallow-bottomed groove; that is, the resultant product is unacceptable. In addition, the welding area is not large enough; that is, the upper and lower reels 4, 5 are not satisfactorily welded together.

In the case of the conventional reels 3 shown in FIG. 2, the lower reel 5 is prevented from turning as follows: That is, in order to prevent the lower reel 5 from turning, after the lower reel 5 is set on the upper reel 4, the lower reel 5 must be turned at most 90°. Accordingly, it is impossible to subject the upper and lower reels 4, 5 to ultrasonic work immediately after the lower reel 5 is set on the upper reel 4. Furthermore, a metal mold for forming the turn-preventing stoppers 4f and the cuts 5d is intricate in configuration. Therefore, there is a strong demand for the provision of turn-preventing means which replaces the turn-preventing stoppers 4f and the cuts 5d.

Furthermore, in the conventional magnetic tape cartridge, as shown in FIG. 3(a) the rib 5a is molten starting from its end by pressure excitation, and the molten resin spreads gradually in the shallow-bottomed groove according to the pressure.

However, in practice, as indicated by a group of dots in FIG. 3(b), owing to the pressure which is applied simultaneously when the melting operation starts a part of the molten resin sometimes flows over the stopper ring 4e to the outer periphery of the boss section 4b. The molten resin thus caused to over-flow is solidified as cooled, thus sticking onto the outer periphery. Hence, when the tape 20 is wound on the reel 3, the winding center is shifted from the true center; that is, the resultant product is unacceptable.

SUMMARY OF THE INVENTION

Accordingly, an object of the invention is to provide a magnetic tape cartridge in which the above-described difficulties accompanying a conventional magnetic tape cartridge have been eliminated.

Accordingly, a first object of the invention is to provide a magnetic tape cartridge having a reel which is high in weldability, and is so shaped that it is increased in the area of a stopper surface during welding, whereby the upper and lower reels are sufficiently high in parallelism.

The first object of the invention has been achieved by the provision of a magnetic tape cartridge having a reel which comprises an upper reel and a lower reel which are plastic moldings, the lower reel being welded to the upper reel by ultrasonic welding;

in which, according to the invention,
in the shoulder of a boss section of the upper reel, a plurality of recesses are formed in such a manner that the recesses are radially outwardly extended from the center of rotation of the upper reel, and
on the surface of the lower reel which are confronted with the recesses, a plurality of welding ribs are formed so as to be engaged with the bottoms of the recesses.

Furthermore, the first object has been achieved by the provision of a magnetic tape cartridge having a reel which comprises an upper reel and a lower reel which are plastic molding, the lower reel being welded to the upper reel by ultrasonic welding;

in which, according to the invention,
on a shoulder surrounding the recesses of the upper reel, welding stopper surfaces are provided in such a manner that the welding stopper surfaces are scattered circumferentially over the whole width of the shoulder.

According to the invention, during ultrasonic welding, the molten ribs form flows of resin only in the recesses, so that the welding operation is achieved with an amount of welding resin corresponding to the number and area of recesses.

Furthermore, with the whole surface of the shoulder surrounding the recesses of the upper reel as the stopper surface, the welding surface spreads radially outwardly, so that the surface contact of the upper and lower reels which have been welded together are high in parallelism.

In the invention, the welding ribs may be extended radially outwardly from the peripheral edge of the central hole of the lower reel, or they may be curved spirally from the peripheral edge of the central hole, or they may be protruded in such a manner that they are coaxial with the peripheral edge of the central hole.

A second object of the invention is to provide a magnetic tape cartridge in which the above-described difficulties accompanying a conventional magnetic tape cartridge have been eliminated, and in which, immediately after the lower reel is set on the upper reel, those reels can be subjected to ultrasonic welding as they are (without turning the lower reel), and a reel metal mold is simple in construction.

The second object has been achieved by the provision of a magnetic tape cartridge having a reel which comprises an upper reel and a lower reel which are thermoplastic resin moldings, the lower reel being welded to the upper reel by ultrasonic welding with a welding rib protruded from the lower reel abutted against the shoulder of a boss section protruded from the upper reel, in which, according to the invention,
the surface of the shoulder of the upper reel is roughened.

According to the invention, the lower reel is set on the upper reel, and under this condition, those reels are pressurized. As a result, the welding rib is pushed against the roughened surface to provide a frictional force which prevents the reels from turning circumferentially. This makes it possible to subject the reels to ultrasonic welding. The surface roughing metal molding is not intricate in structure when compared with the conventional one.

A third object of the invention is to provide a magnetic tape cartridge in which the above-described difficulties accompanying a conventional magnetic tape cartridge have been eliminated, and which has a reel in which, when the reel is manufactured, the molten resin is prevented from flowing over the outer periphery of the boss section to prevent the formation of an unsatisfactory product thereby to improve the product yield.

The third object of the invention has been achieved by the provision of a magnetic tape cartridge having a reel which comprises an upper reel and a lower reel which are thermoplastic resin moldings, the lower reel being welded to the upper reel by ultrasonic welding with a welding rib protruded from the lower reel abutted against the shoulder of a boss section protruded from the upper reel, in which, according to the invention,
the surface of the shoulder of the upper reel is roughened.

In the invention, even if, during ultrasonic welding, the molten resin tends to flow over the outer periphery in response to a pressurizing force applied thereto, the overflow of the molten resin is stopped because the gap provided the walls are narrowed.

The nature, utility and principle of the invention will be more clearly understood from the following detailed description and the appended claims when read in conjunction with the accompanying drawings.

BRIEF DESCRIPTION OF THE DRAWING(S)

Figure 3A:
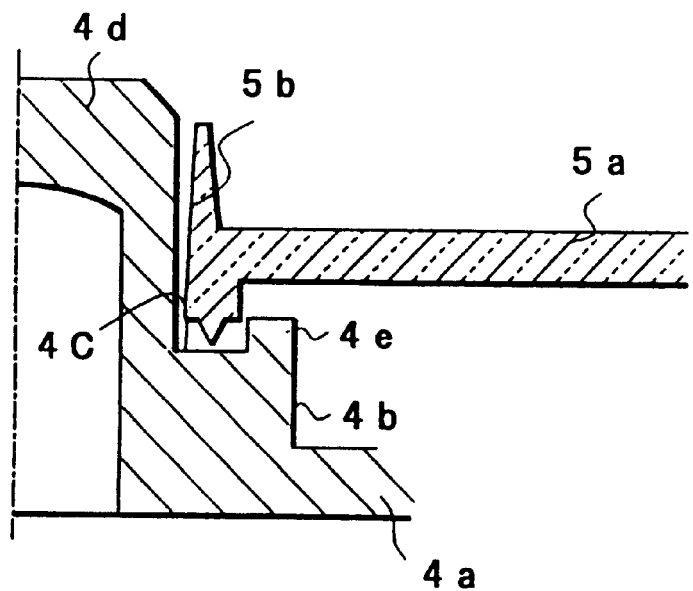
Figure 3B:
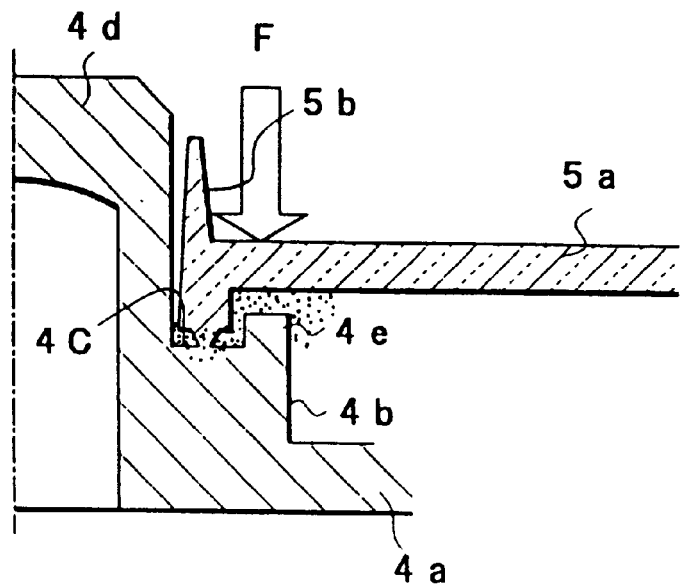
Figure 4:
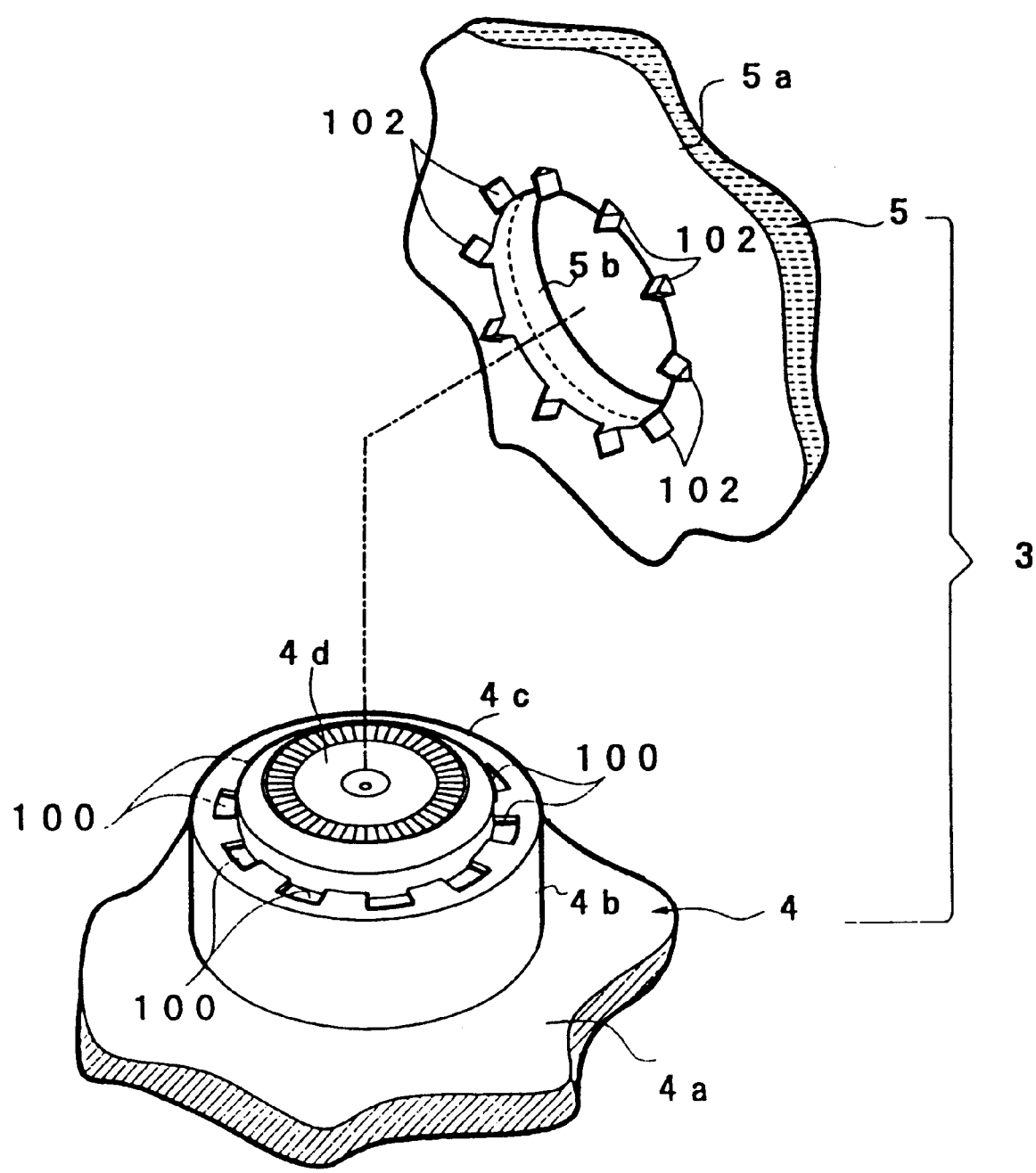
Figure 5:
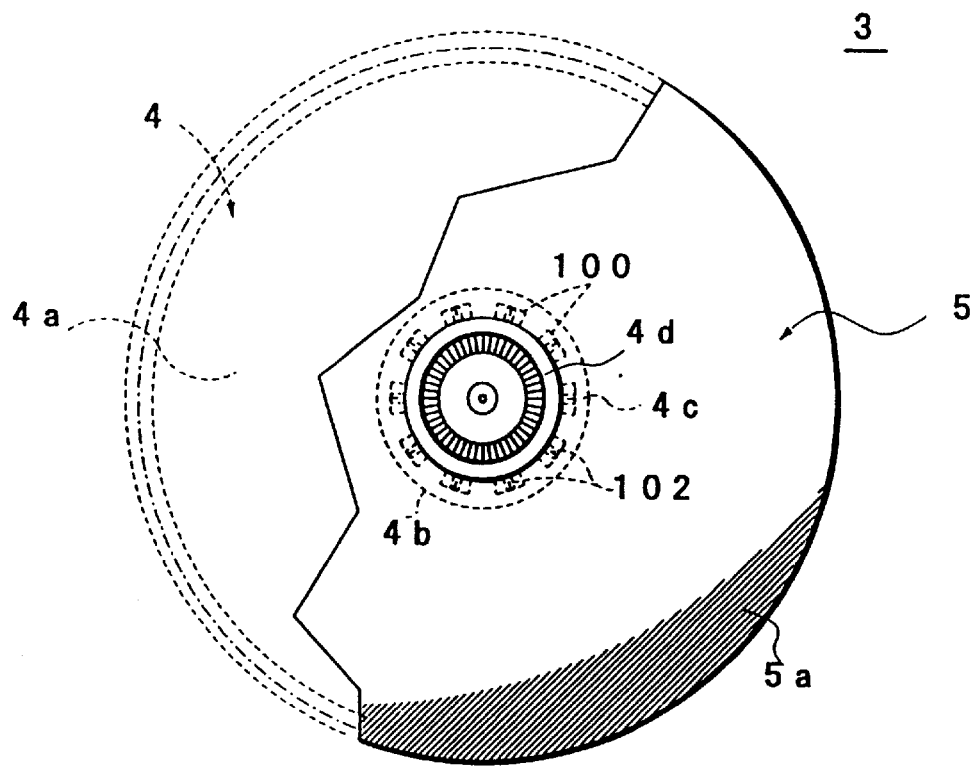
Figures 6A, 6B:
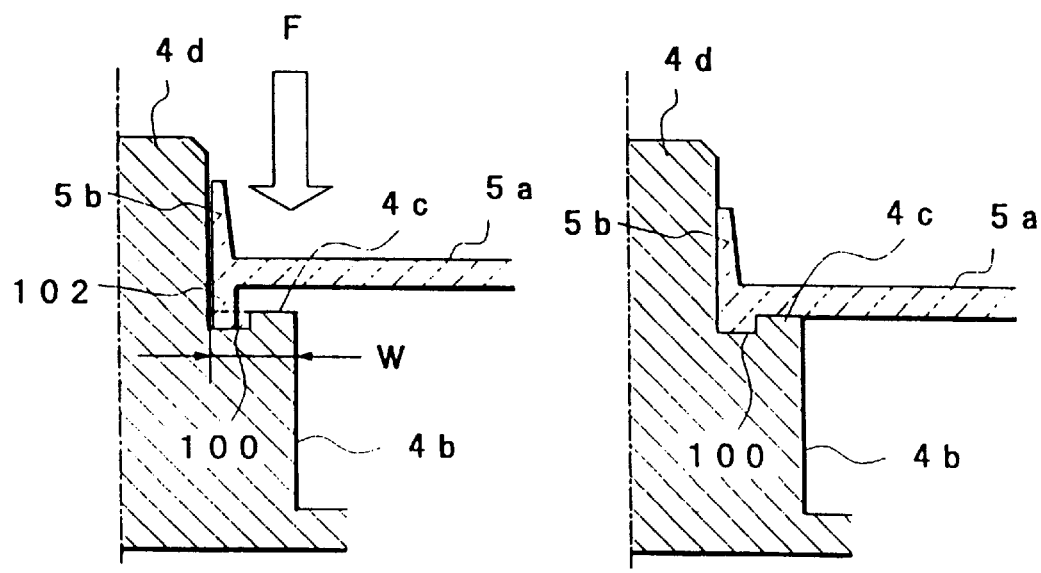
Figure 7:
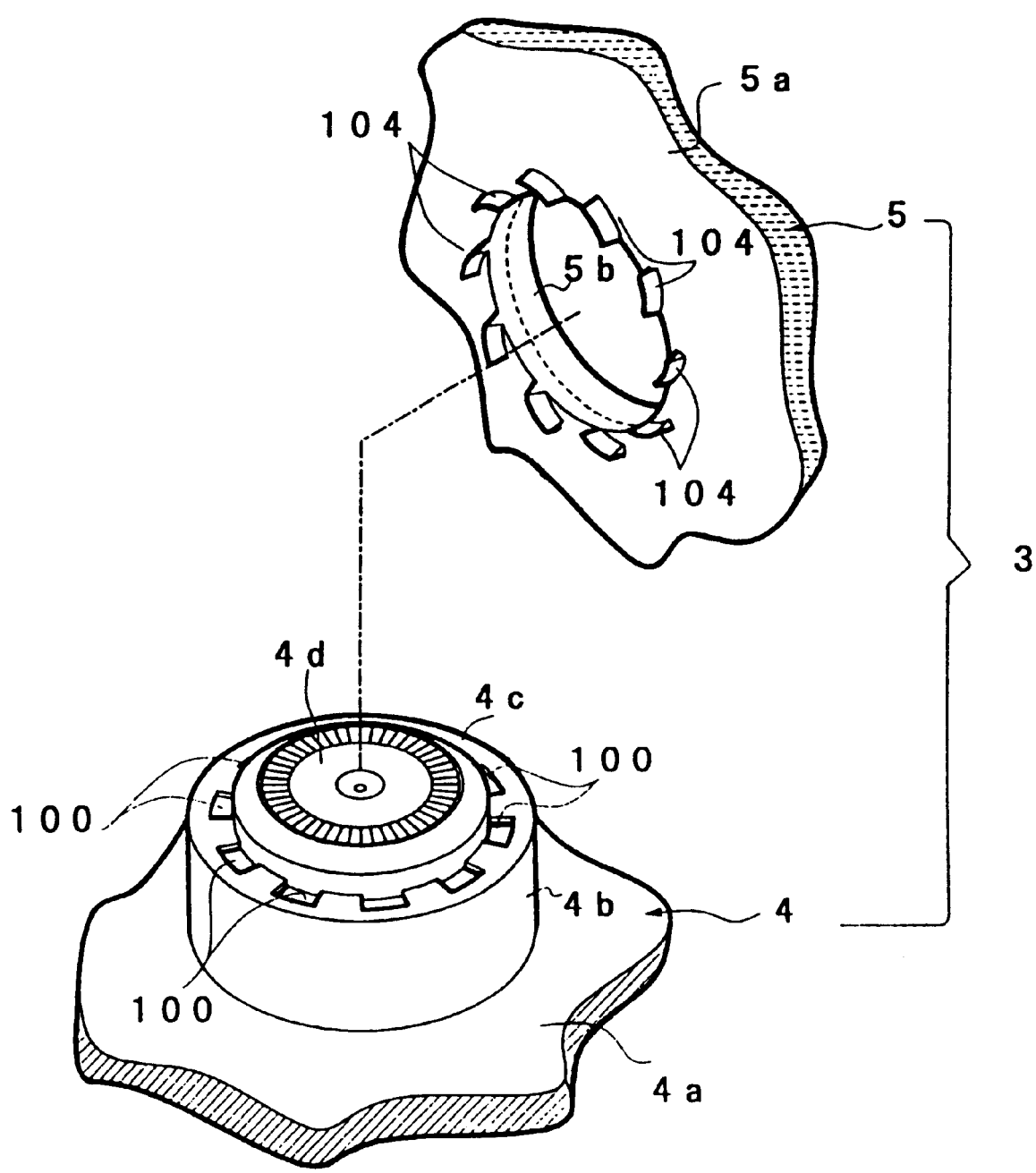
Figure 8:
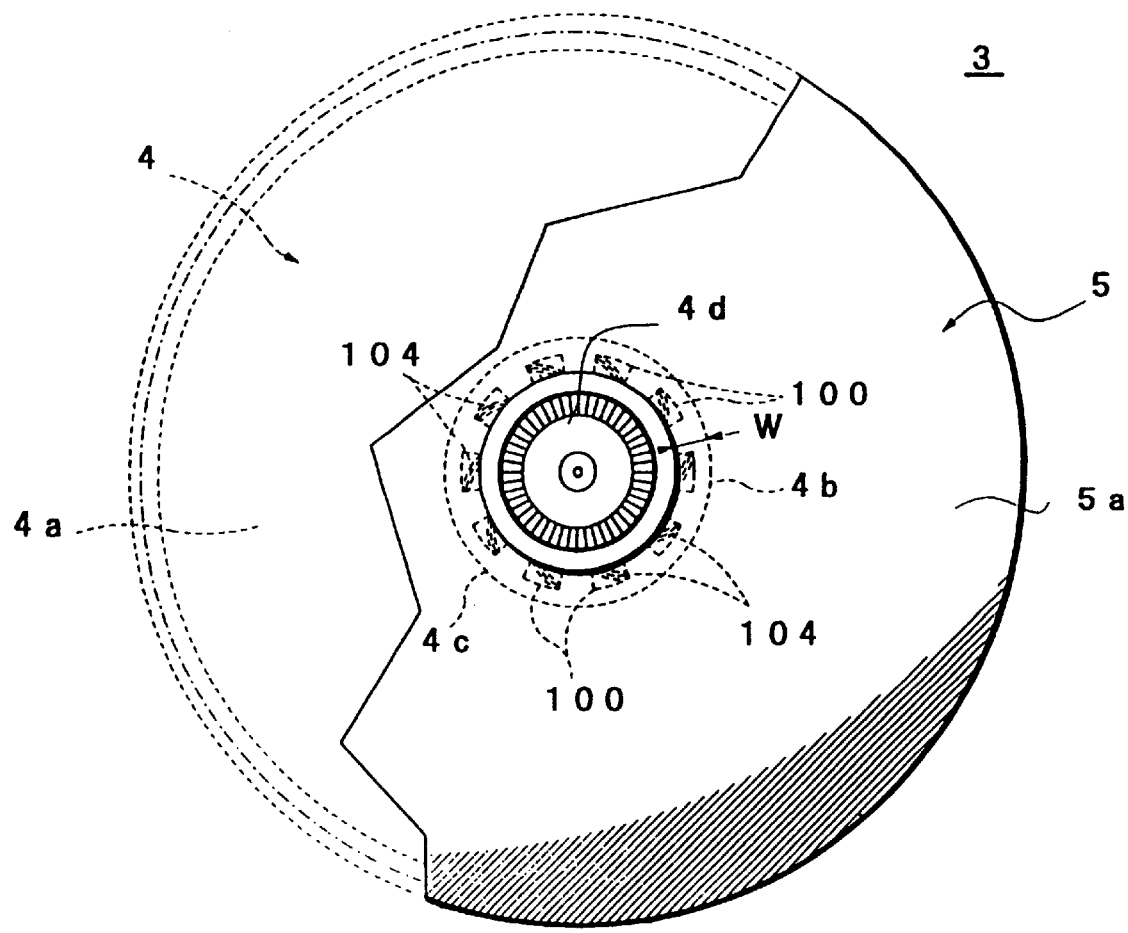
Figure 9:
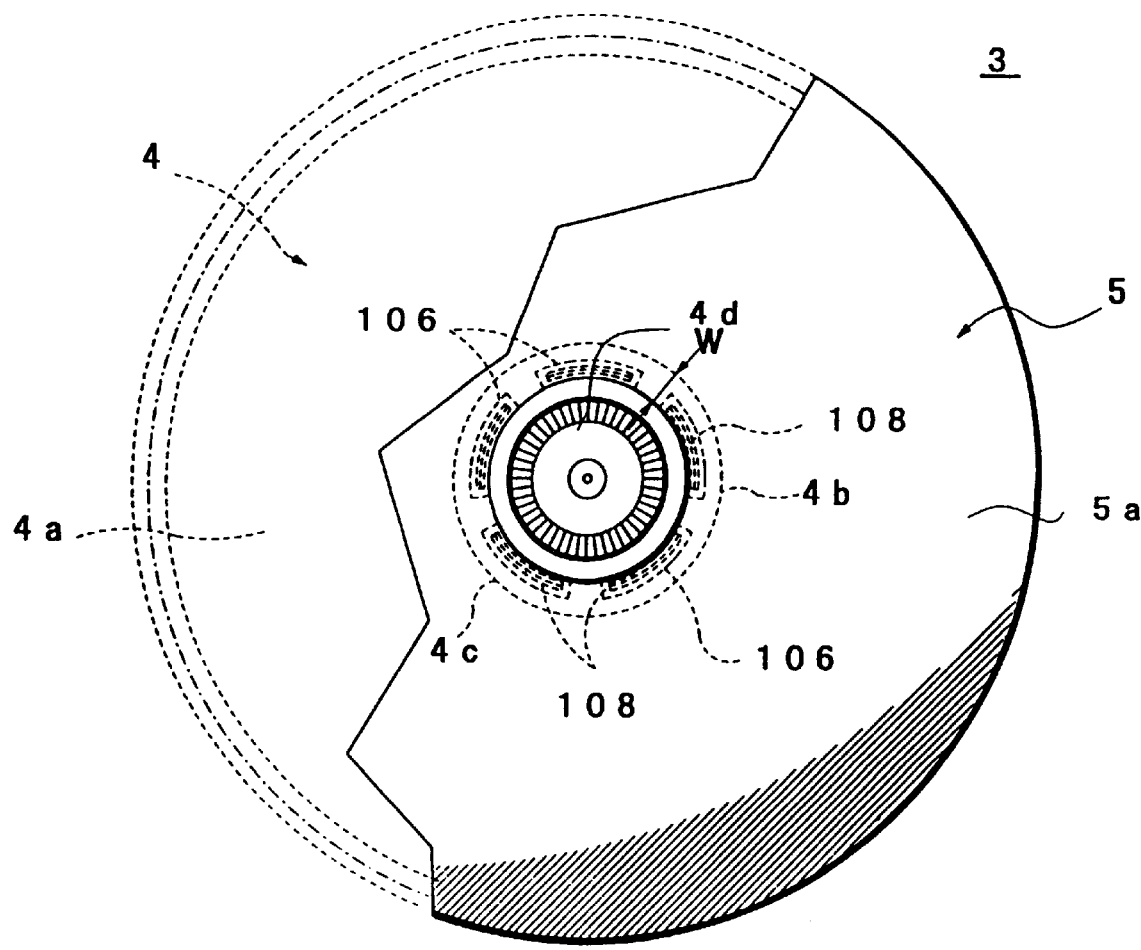
Figure 10:
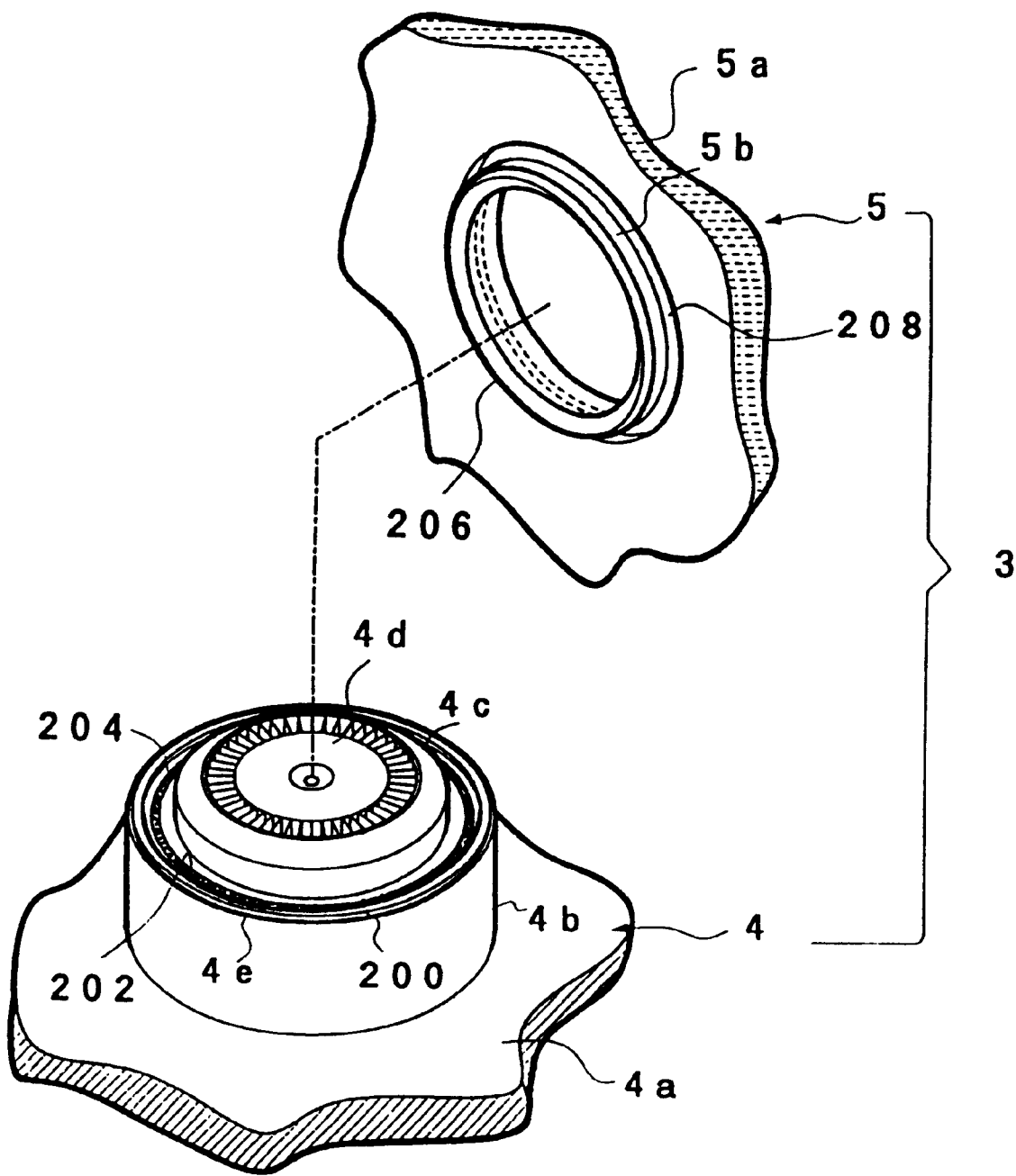
Figure 11:
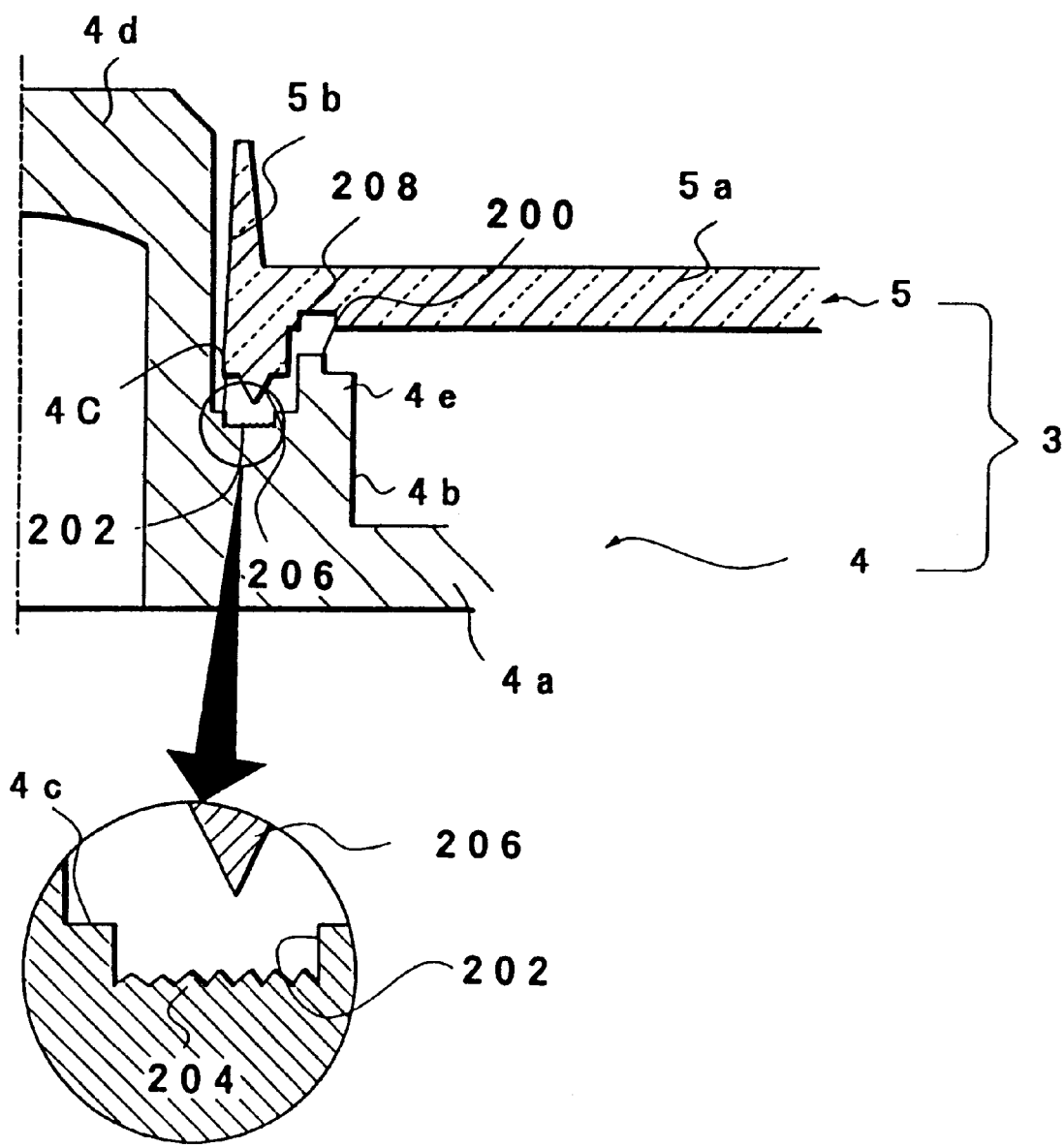
Figure 12:
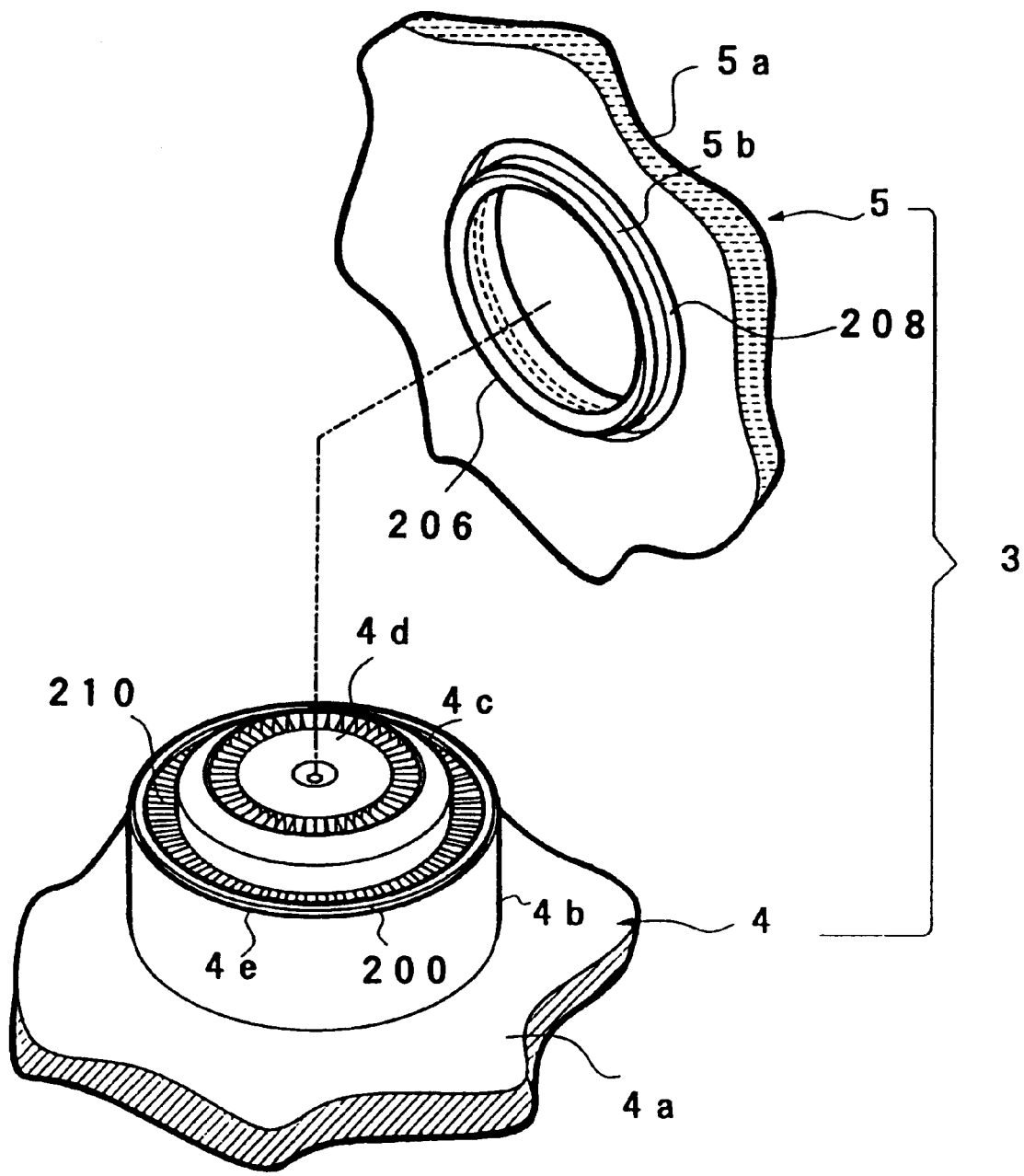
Figure 13:
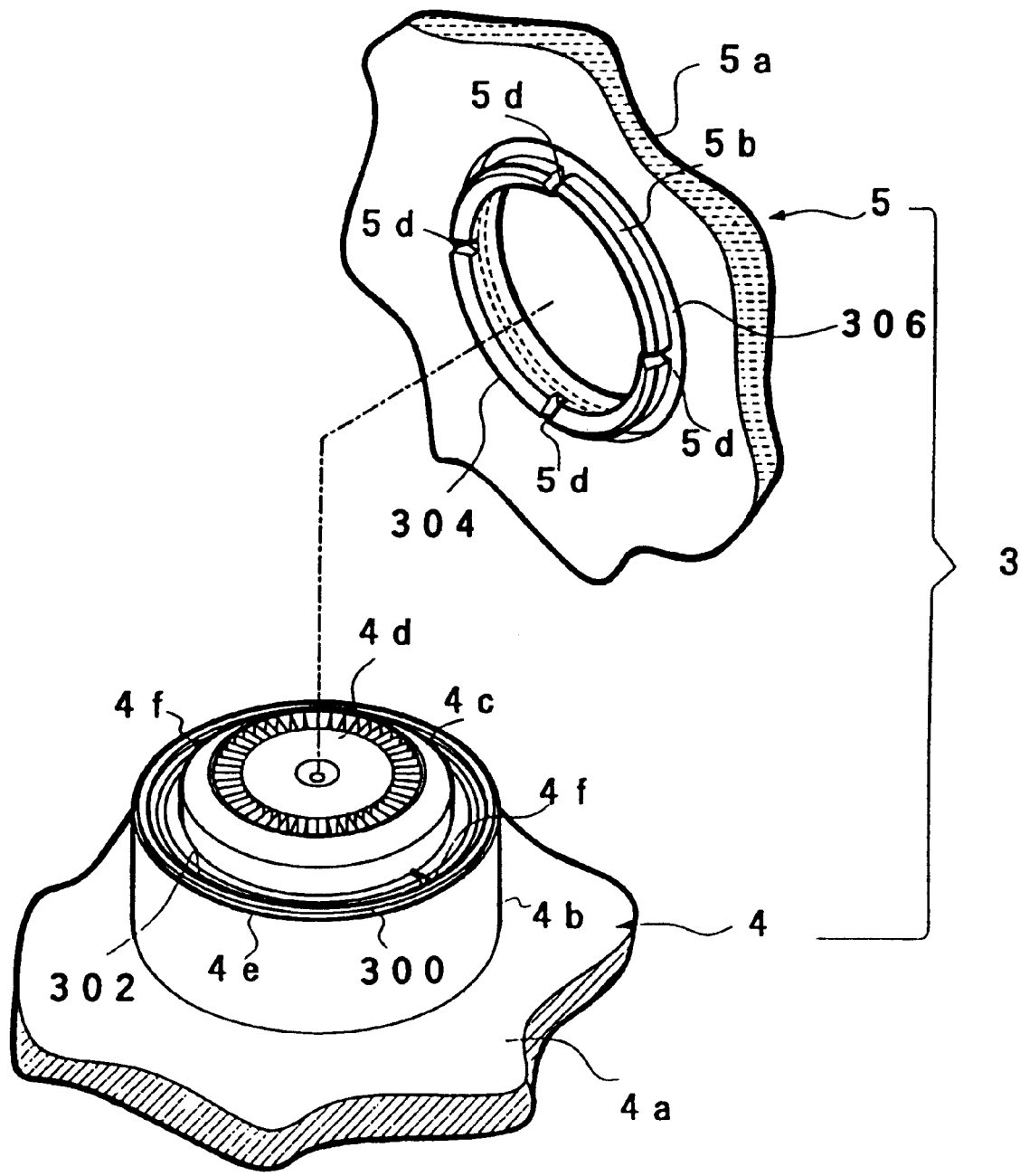
Figure 14A:
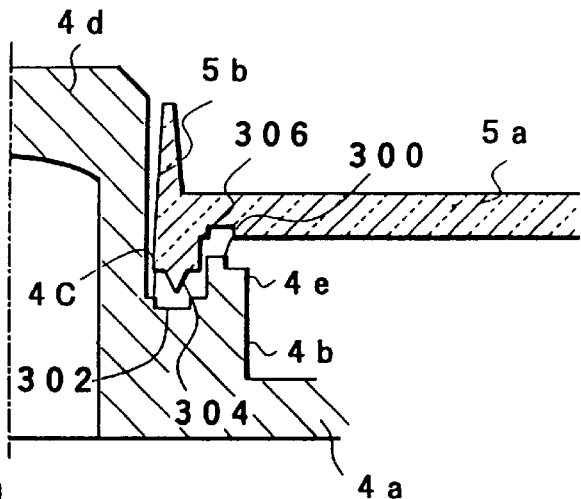
Figure 14B:
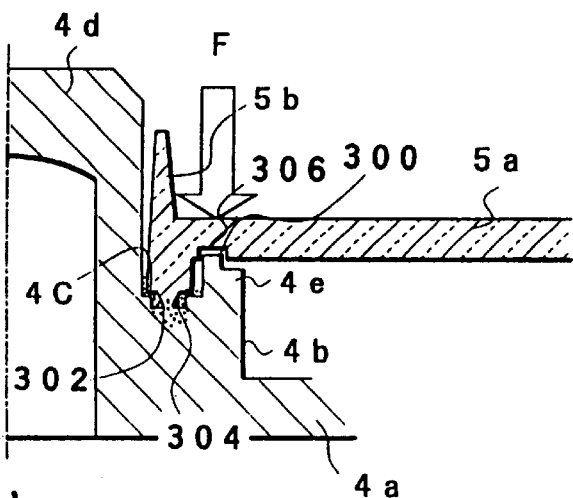
Figure 14C:
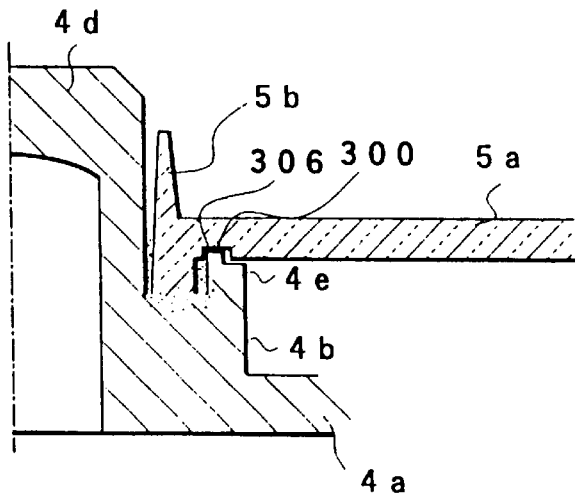

FIGS. 3(a) and 3(b) are diagrams for a description of the ultrasonic welding operation in the conventional magnetic tape cartridge;

FIG. 4 is an exploded perspective view, with parts cut away, showing an example of a magnetic tape cartridge, which constitutes a first embodiment of the invention;

FIG. 5 is a plan view, with parts cut away, showing the assembly of an upper reel and a lower reel in the first embodiment of the invention;

FIGS. 6(a) and 6(b) are sectional diagrams for a description of the welding operation of the upper and lower reels;

FIG. 7 is an exploded perspective view, with parts cut away, showing another example of a magnetic tape cartridge, which constitutes a second embodiment of the invention;

FIG. 8 is a plan view, with parts cut away, showing the assembly of an-upper reel and a lower reel in the second embodiment of the invention;

FIG. 9 is a plan view, with parts cut away, showing the assembly of upper and lower reels in another example of the magnetic tape cartridge, which constitutes a third embodiment of the invention;

FIG. 10 is an exploded perspective view, with parts cut away, showing upper and lower reels in another example of the magnetic tape cartridge, which constitutes a fourth embodiment of the invention;

FIG. 11 is a sectional half-view showing essential components of the fourth embodiment of the invention;

FIG. 12 is an exploded perspective view, with parts cut away, showing upper and lower reels in another example of the magnetic tape cartridge, which constitutes a fifth embodiment of the invention;

FIG. 13 is an exploded perspective view, with parts cut away, showing upper and lower reels in another example of the magnetic tape cartridge, which constitutes a sixth embodiment of the invention; and FIGS. 14(a)–14(c) are sectional half-views for a description of the welding operation of the upper and lower reels in the sixth embodiment.

DETAILED DESCRIPTION OF THE PREFERRED EMBODIMENTS

Preferred embodiments of the invention will be described with reference to the accompanying drawings.

First Embodiment

An example of a magnetic tape cartridge, which constitutes a first embodiment of the invention, will be described with reference to FIGS. 4 through 6. In the magnetic tape cartridge, the first embodiment, its reel is fundamentally equal in configuration to the one in the above-described conventional magnetic tape cartridge; and in FIGS. 4 through 6 parts corresponding functionally to those already described with reference to FIGS. 1 through 3 (the conventional magnetic tape cartridge) are therefore designated by the same reference numerals or characters.

As shown in FIG. 4, the shoulder 4c of an upper reel 4 has a protrusion 4d, and has nine (9) recesses 100 in such a manner that the recesses 100 are extended radially outwardly from the outer cylindrical surface of the protrusion 4d. Each of the recesses 100 is deeper than the conventional one, and an odd number of recesses 100 are arranged at equal intervals to prevent the mold from bending.

On the other hand, a plurality of welding ribs 102, the number of which is equal to that of the aforementioned recesses 100, are arranged along the peripheral edge of the central hole of the lower reel 5 at equal intervals.

Each of the welding ribs 102 is triangular extending downwardly from the lower flange 5a, and it is equal in volume to each of the recesses 100.

Therefore, in the gaps between the recesses 100, the whole width W of the shoulder 4c can be utilized as a stopper surface. As shown in FIG. 6(a), when the lower reel 5 is slightly turned about the upper reel 4 with the lower reel 5 engaged with the upper reel 4, the protrusions 102 are fixedly fitted in the recesses 100, respectively. Hence, the upper and lower reels can be subjected to ultrasonic welding.

Accordingly, under this condition, an ultrasonic horn is pushed against the whole periphery of the opening of the lower reel 5 as indicated by the arrow; that is, the upper and lower reels are subjected to ultrasonic excitation under a predetermined pressurizing force F. As a result, the welding ribs 102 are molten in the recesses 100, thus filling the-recesses 100. Finally, as shown in FIG. 6(b), the lower flange 5a abuts against the whole surface of the shoulder 4c. Thus, the lower reel 5 is positioned with respect to the upper reel 4.

In this case, with respect to the contact area in the direction of diameter, the whole width W of the shoulder can be utilized. Therefore, the upper and lower reels are maintained high in parallelism. The welding area is smaller than that of the conventional magnetic tape cartridge; however, the welding depth is larger, and the number of welding parts is plural. Hence, the welding strength is equal to that of the conventional magnetic tape cartridge. Furthermore, because of the increase in welding area, the difference between the load during the welding operation and that after the welding operation is great, which makes it possible to readily achieve the detection of the completion of the welding operation with a sensor or the like.

Second Embodiment

Another example of the magnetic tape cartridge, a second embodiment of the invention, will be described with reference to FIGS. 7 and 8. As is seen from those figures, the number and interval of the recesses 100 of the upper reel 4 are equal to those in the above-described first embodiment. However, it should be noted that the welding ribs 104 of the lower reel 5 are extended spirally from the periphery of the central opening. This structure positively prevents the lower reel from turning about upper reel when compared with that of the first embodiment.

Third Embodiment

Another example of the magnetic tape cartridge, a third embodiment of the invention, will be described with reference to FIG. 9. In the third embodiment, in the shoulder 4c, the number of recesses 106 is only five (5); however, they are spread circumferentially. On the other hand, in the lower reel 5, welding ribs 108 are protruded at equal intervals in correspondence to the recesses 106 in such a manner that they 108 are coaxial with the periphery of the central hole.

In the third embodiment, the welding area is larger than that in the above-described embodiments, while the stopper area is smaller. Therefore, the length of the stopper surface as viewed in the direction of diameter is substantially equal to that in the above-described embodiment. Hence, the upper and lower reels are maintained high in parallelism.

As is apparent from the above description, in the magnetic tape cartridge of the invention, the reel welding characteristic is maintained high, and during the welding operation the area of the stopper surface is sufficiently spread: Hence, the upper and lower reels are sufficiently high in parallelism. This feature prevents the lowering of production yield which may be caused by surface play.

Fourth Embodiment

Figure 1:
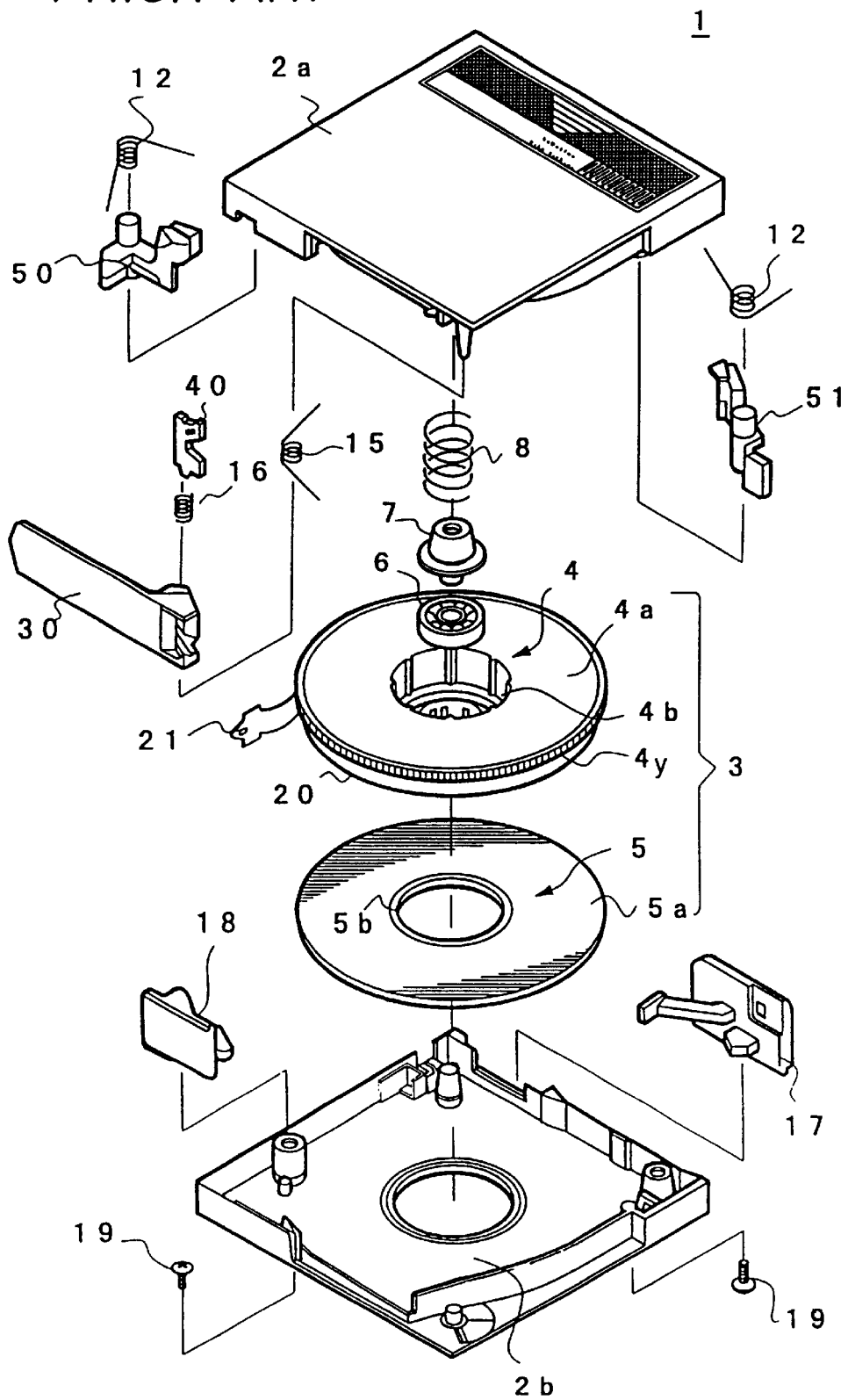
FIG. 1 is an exploded perspective view of a conventional magnetic tape cartridge.
Figure 2:
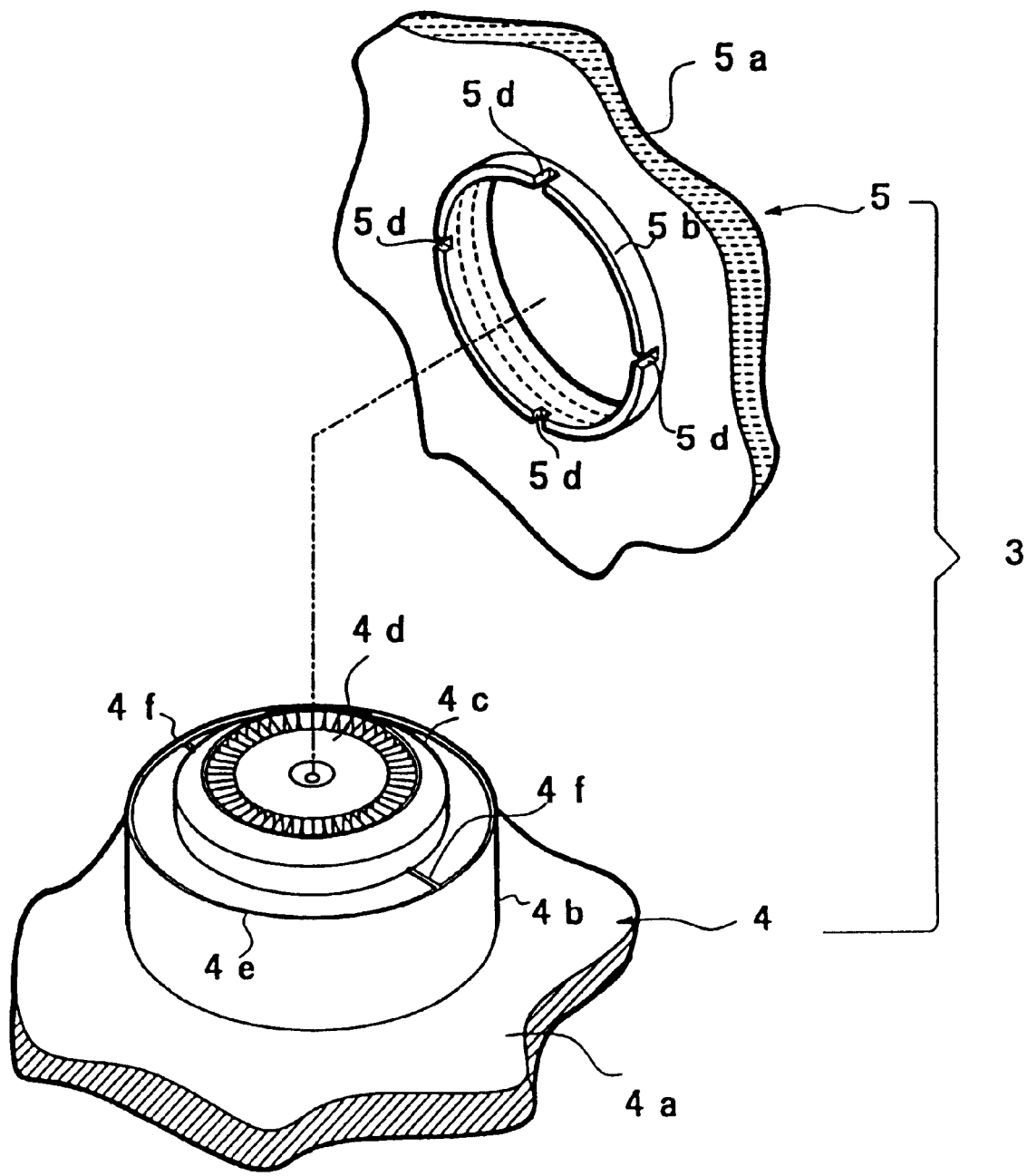
FIG. 2 is an exploded perspective view, with parts cut away, showing an example of the ultrasonic welding section in the conventional magnetic tape cartridge.

Another example of the magnetic tape cartridge, a fourth embodiment of the invention, will be described with reference to FIGS. 10 and 11. In the fourth embodiment, the reel configuration is fundamentally equal to that in the prior art. Therefore, in FIGS. 10 and 11, parts corresponding functionally to those already described with reference to FIGS. 1 through 3 are therefore designated by the same reference numerals or characters.

Similarly as in the case of the conventional magnetic tape cartridge, an over-flow preventing stopper ring 4e is formed around the periphery of the shoulder 4c of the upper reel 4. On the inner periphery of the stopper ring 4e, a barrier 200 (higher than the stopper ring 4e) is formed in such a manner that it is protruded from the stopper ring 4e.

Between the stopper ring 4e and the protrusion 4d, a groove 202 is formed coaxial with the stopper ring in such a manner that it is deeper. The inner bottom surface of the groove 202, as shown in FIG. 11, is a roughened surface 204.

On the other hand, the welding rib 5b of the lower reel 5 has welding section 206 on the end which is substantially triangular in section and engaged with the aforementioned deep groove 202. And the outer periphery of the welding rib 5b has a recess 208 in such a manner that the former is coaxial with the latter, and the recess 208 is labyrinth-engaged with the aforementioned barrier 200.

Hence, when the lower reel 5 is set on the upper reel 4, those reels are labyrinth-engaged with each other, and the end of the welding section 206 is abutted against the roughened surface 204, thus providing a frictional force which prevent the circumferential movement of the reels. Hence, the reels can be subjected to the welding operation immediately. The relative surface roughness of the roughened surface 204 to provide the frictional force is preferably 5 to 100 μm in Rz (ten-point average roughness), more preferably 8 to 70 μm, and most preferably 10 to 50 μm.

In the following process, the upper and lower reels are subjected to ultrasonic excitation while being pressurizing with the ultrasonic horn. As a result, the welding section 206 abutted against the deep groove 202 is molten beginning with its end, and the deep groove 202 is also partially molten. The molten resin flows to spread in the deep groove 202, and tends to flow over the deep groove 202. However, the amount of over-flow is relatively small because the distance between the shoulder of the welding rib 5b and the edge of the deep groove 202.

As the process advances, the molten resin caused to flow over the deep groove 202 tends to pass through the gap between the barrier 200 and the recess 208; however, since the gap is further reduced, the molten resin is detained in the gap between the barrier 202 and the welding rib 5b, and between the welding rib 5b and the periphery of the protrusion. Under this condition, the pressure torque variation is detected, and the ultrasonic work is accomplished. After the work, the molten material is solidified by cooling, so that the upper and lower reels 4 and 5 are provided as one unit.

Fifth Embodiment

Another example of the magnetic tape cartridge, a fifth embodiment of the invention, will be described with reference to FIG. 12.

The fifth embodiment is different from the fourth embodiment only in that, instead of the roughened surface 204, a roughened portion 210 is formed which comprises a number of ribs which are radially outwardly extended. Similarly as in the above-described embodiment, when the welding portion 206 is engaged with the roughened portion 210, the lower reel is prevented from turning with respect to the upper reel. In this connection, it is preferable that the height of each of the ribs forming the roughened portion 210 is in a range of from 10 μm to 50 μm.

As is apparent from the above description, the magnetic tape cartridge of the invention is advantageous in the following points: Even if, after the lower reel is set on the upper reel, those reels are subjected to ultrasonic treatment, the resultant vibration will never turn the reels. This feature shortens the time required for ultrasonic treatment, and the metal mold for the magnetic tape cartridge of the invention is not intricate in construction when compared with the one for the conventional magnetic tape cartridge.

Sixth Embodiment

Another example of the magnetic tape cartridge, a sixth embodiment of the invention, will be described with reference to FIGS. 13 and 14. In the sixth embodiment, the reel is fundamental equal in configuration to the one in the conventional magnetic tape cartridge. In FIGS. 13 and 14, parts corresponding functionally to those already described with reference to the prior art are therefore designated by the same reference numerals or characters.

Similarly as in the case of the conventional magnetic tape cartridge, an over-flow preventing stopper ring 4e is protruded from the outer periphery of the shoulder 4c of the upper ring 4. Inside the stopper ring 4e, a barrier 300 (larger in height than the former) is protruded in such a manner that it is extended along the stopper ring 4e. A deeper groove 302 is formed between the stopper ring 4e and the protrusions 4d in such a manner that the groove 302 is coaxial with the stopper ring 4e and the protrusion 4d.

On the other hand, welding portions 304 are extended from the end of the welding rib 5b of the lower reel 5. The welding portions 304 are each substantially triangular in section, and are engaged with the aforementioned deep groove 302. The outer periphery of the welding rib 5b has a recess 306 which is labyrinth-engaged with the barrier 300. The recess 306 is arranged coaxial with the welding rib 5b.

Hence, as shown in FIG. 14(a), when the lower-reel 5 is set on the upper reel 4, those reels are labyrinth-engaged with each other.

Under this condition, as shown in FIG. 14(b), the upper and lower reels are subjected to ultrasonic excitation while being pressurized (the pressurizing force F) with the ultrasonic horn. As a result, the welding section 304 abutted against the deep groove 302 is molten beginning with its end, and the deep groove 302 is also partially molten. The molten resin (indicated by a group of dots in FIG. 14(b) flows to spread in the deep groove 302, and tends to flow over the deep groove 302. However, the amount of overflow is relatively small because of the distance between the shoulder of the welding rib 5b and the edge of the deep groove 302.

As the process advances, the molten resin caused to flow over the deep groove 302, as shown in FIG. 14(c), tends to flow through the gap between the barrier 300 and the recess 306; however, since the gap is further reduced, the molten resin is detained in the gap between the barrier 302 and the welding rib 5b, and between the welding rib 5b and the periphery of the protrusion 4d. Under this condition, the pressure torque variation is detected, and the ultrasonic work is accomplished. After the work, the molten material is solidified by cooling, so that the upper and lower reels 4 and 5 are provided as one unit.

In the above-described embodiment, the ultrasonic welding operation is carried out with the welding portion 304 of the welding rib 5b abutted against the deep groove 302. This is to double the labyrinth effect. However, the above-described construction can be simplified with the same effect. That is, merely by adding the barrier 300 and the recess 306 to the structure of the prior art, the over-flow preventing effect can be obtained.

As is apparent from the above description, in the magnetic tape cartridge of the invention, merely by modifying the configuration of the reel the molten resin can be prevented from flowing over the outer periphery of the boss section; that is, the lowering of production yield attributing to the over-flowing of the molten resin can be positively prevented.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A magnetic tape cartridge having a reel which comprises an upper reel and a lower reel which are thermoplastic resin moldings, said lower reel being welded to said upper reel by ultrasonic welding with a welding rib protruded from said lower reel abutted against the shoulder of a boss section protruded from said upper reel, in which on a part of an over-flow preventing stopper ring which is protruded from the outer periphery of said shoulder of said upper reel, a barrier is formed which is higher than said part, and on the surface of said lower reel which is confronted with said stopper ring, a recess is formed which is labyrinth-engaged with said barrier.

* * * * *